United States Patent
Kobayashi et al.

(10) Patent No.: US 11,598,750 B2
(45) Date of Patent: Mar. 7, 2023

(54) EDDY CURRENT FLAW DETECTION DEVICE AND EDDY CURRENT FLAW DETECTION METHOD

(71) Applicant: TOSHIBA ENERGY SYSTEMS & SOLUTIONS CORPORATION, Kawasaki (JP)

(72) Inventors: Noriyasu Kobayashi, Yokohama Kanagawa (JP); Jun Semboshi, Yokohama Kanagawa (JP); Megumi Akimoto, Tokyo (JP); Masaru Ukai, Yokohama Kanagawa (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/156,834

(22) Filed: Jan. 25, 2021

(65) Prior Publication Data

US 2021/0172908 A1   Jun. 10, 2021

Related U.S. Application Data

(63) Continuation of application No. PCT/JP2019/030938, filed on Aug. 6, 2019.

(30) Foreign Application Priority Data

Aug. 6, 2018   (JP) .............................. JP2018-147416

(51) Int. Cl.
   *G01N 27/904*   (2021.01)
(52) U.S. Cl.
   CPC .................................. *G01N 27/904* (2013.01)
(58) Field of Classification Search
   None
   See application file for complete search history.

(56) References Cited

U.S. PATENT DOCUMENTS

| | | | |
|---|---|---|---|
| 4,740,747 A * | 4/1988 | Kawashima | ........... G01N 27/72 324/203 |
| 2004/0058545 A1* | 3/2004 | Gotkis | ................. G01N 27/023 438/692 |

(Continued)

FOREIGN PATENT DOCUMENTS

| DE | 10 2015 203 560 A | 9/2016 |
|---|---|---|
| EP | 1 022 563 A1 | 7/2000 |

(Continued)

OTHER PUBLICATIONS

Kurokawa Masaaki et al.; Eddy-Current Flaw Detector Probe; EP 1022563 A1; Date Published Jul. 26, 2000; Mitsubishi Heavy Industries Ltd.; G01N27/90 (Year: 2000).*

*Primary Examiner* — Nasima Monsur
(74) *Attorney, Agent, or Firm* — Finnegan, Henderson, Farabow, Garrett & Dunner, LLP

(57) ABSTRACT

An eddy current flaw detection device according to an embodiment includes: a first exciter/detector that is supplied with alternating current and can induce eddy current in a tested object by generating a magnetic field change in the tested object; a second exciter/detector disposed opposite side of the first exciter/detector sandwiching the tested object therebetween. The second exciter/detector can detect a change in a reactive magnetic field generated by the eddy current. The first and second exciter/detectors each may have a coil including a helical coil wire, and the coil wire of the first exciter/detector may be thicker than the coil wire of the second exciter/detector.

7 Claims, 6 Drawing Sheets

(56) References Cited

U.S. PATENT DOCUMENTS

2010/0148766 A1* 6/2010 Weischedel ........ G01N 27/9006
                                                                  324/238
2011/0068807 A1    3/2011 Kesil et al.

FOREIGN PATENT DOCUMENTS

| JP | S58-83252 A | 5/1983 |
|----|---|---|
| JP | S59-231445 A | 12/1984 |
| JP | S59-231445 A | 12/1984 |
| JP | H9-33489 A | 2/1997 |
| JP | 2003-248851 A | 9/2003 |
| JP | 2006-500590 A | 1/2006 |
| JP | 2009-204342 A | 9/2009 |
| RU | 2 629 901 C2 | 10/2013 |

* cited by examiner

EDDY CURRENT FLAW DETECTION DEVICE AND EDDY CURRENT FLAW DETECTION METHOD

CROSS-REFERENCE TO RELATED APPLICATIONS

This application is a continuation application of International Application PCT/JP2019/030938 filed on Aug. 6, 2019, the entire content of which is incorporated herein by reference. This application is based upon and claims the benefit of priority from Japanese Patent Application No. 2018-147416, filed on Aug. 6, 2018; the entire content of which is incorporated herein by reference.

FIELD

Embodiments of the present invention relate to eddy current flaw detection devices and eddy current flaw detection methods.

BACKGROUND

Generally, in eddy current detection, alternating current from an alternating current power source is supplied to an excitation coil to induce eddy current in the vicinity of a surface of a tested object made of a metal material. A reactive magnetic field generated by the eddy current is detected by a detection coil. If there is a flaw in the vicinity of the tested object, the eddy current would change due to the flaw, and intensity and distribution of the reactive magnetic field generated by the eddy current would also change. Thus, the flaw can be detected.

A complex material, which is composed of a plurality of different materials in a layer structure or with fiber structure, may have a lower electric conductivity compared to metals. When a tested object is made of a complex material in an eddy current flaw detection, eddy current density induced in the complex material becomes low due to the low electric conductivity of the complex material. Thus, the magnetic flux density in the reactive magnetic field generated by the eddy current becomes low, and flaw detection sensitivity becomes low.

DETAILED DESCRIPTION

Figure 1:
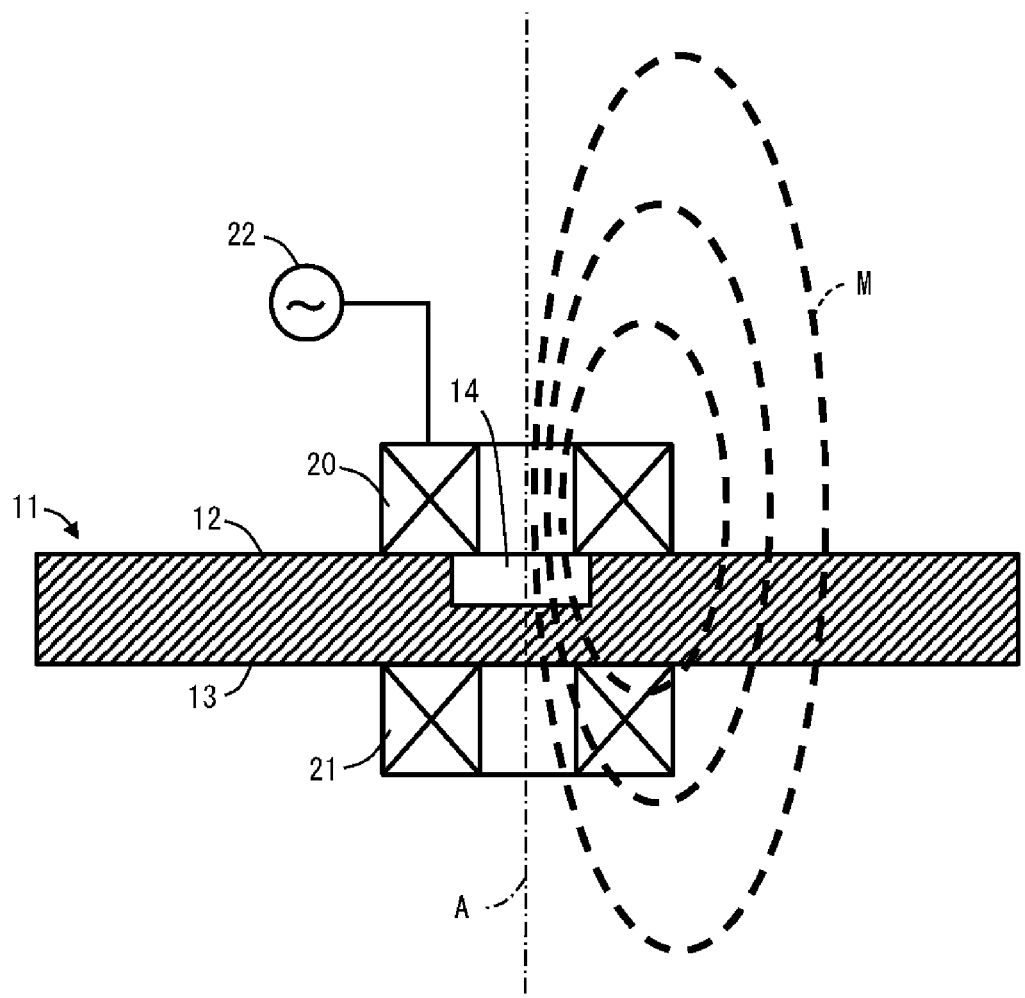
FIG. 1 is a schematic cross-sectional view illustrating a situation where flaw detection is conducted using an eddy current flaw detection device according to a first embodiment of the present invention.

A technique using a magnetic flux meter of a superconducting quantum interference device (SQUID) is known to improve flaw detection sensitivity of eddy current flaw detection under a weak magnetic field. With such a technique, improvement in flaw detection sensitivity of eddy current flaw detection under a weak magnetic field is expected owing to the high sensitivity of the SQUID magnetic flux meter to a magnetic field. However, the SQUID magnetic flux meter requires a cooling mechanism, and the device has a complex structure. Thus, the device is expensive, which is a problem to be solved.

The complex material may have a lower electric conductivity compared to metals. When a tested object of the eddy current flaw detection is made of a complex material, the eddy current density in the tested object is lowered and the magnetic flux density generated by the eddy current is lowered, and then, the flow detection sensitivity in the eddy current flaw detection is deteriorated. On the other hand, if a highly sensitive magnetic detector is used as a detector for eddy current flaw detection, the device may have a complex structure and may become expensive.

An object of the embodiments of the present invention is to enable eddy current flaw detection with a simplified and inexpensive device, with high sensitivity, even with a tested object made of a low electric conductivity material such as a complex material.

In order to solve the problems, according to an embodiment, there is presented an eddy current flaw detection device comprising: a first exciter/detector configured to induce eddy current in a tested object; a second exciter/detector disposed opposite side of the first exciter/detector sandwiching the tested object therebetween, the second exciter/detector being configured to detect a change in a reactive magnetic field generated by the eddy current.

According to another embodiment, there is presented an eddy current flaw detection device comprising: an exciter/detector configured to induce eddy current in a tested object and to detect a change in a reactive magnetic field generated by the eddy current; a backside body made of ferromagnetic material disposed opposite side of the exciter/detector sandwiching the tested object therebetween.

According to yet another embodiment, there is presented an eddy current flaw detection method comprising: a first exciter/detector disposing step of disposing a first exciter/detector near a tested object; a second exciter/detector disposing step of disposing a second exciter/detector near the tested object at an opposite side of the first exciter/detector sandwiching the tested object therebetween; an excitation step, after the first and second exciter/detector disposing steps, of inducing eddy current in the tested object by the first exciter/detector; and a detection step of detecting, by the second exciter/detector, a change of reactive magnetic field generated by the eddy current.

According to yet another embodiment, there is presented an eddy current flaw detection method comprising: an exciter/detector disposing step of disposing an exciter/detector near a tested object; a backside body disposing step of disposing a backside body made of ferromagnetic material, near the tested object at an opposite side of the exciter/detector sandwiching the tested object therebetween; an excitation step, after the exciter/detector disposing step and the backside body disposing step, of inducing eddy current in the tested object by the exciter/detector; and a detection step of detecting, by the exciter/detector, a change of reactive magnetic field generated by the eddy current.

According to the embodiments of the present invention, eddy current flaw detection can be conducted with a simplified and inexpensive device, with high sensitivity, even with a tested object made of a low electric conductivity material such as a complex material.

Hereinafter, eddy current flaw detection devices and eddy current flaw detection methods according to embodiments of the present invention will be described with reference to the drawings. In the following description, same or similar parts are assigned common references, and repetitive explanation will be omitted.

First Embodiment

FIG. 1 is a schematic cross-sectional view illustrating a situation where flaw detection is conducted using an eddy current flaw detection device according to a first embodiment of the present invention.

In the first embodiment, a tested object 11 is made of a complex material which has a lower electric conductivity compared to ordinary metals. The complex material may include a complex material using silicon carbide fibers, carbon fiber reinforced plastics (CFRP) or glass fiber reinforced plastics (GFRP). The tested object 11 is shaped in a flat plate, and has a first flat surface 12 and a second flat surface 13 which is an opposite side of and parallel to the first flat surface 12, for example. A flaw (a thinner part) 14 is assumed to exist on the first flat surface 12.

The eddy current flaw detection device according to the first embodiment has an exciter 20 as a first exciter/detector and a detector 21 as a second exciter/detector. Each of the exciter 20 and the detector 21 may include a helical coil, for example. The exciter 20 is disposed on the first flat surface 12 of the tested object 11, while the detector 21 is disposed on the second flat surface 13 of the tested object 11. The exciter 20 and the detector 21 are disposed so that the axis A of the coils is directed perpendicular to the first flat surface 12 and the second flat surface 13. The exciter 20 is connected to an alternating current power source 22. The detector 21 is connected to a detector circuit (not illustrated).

Coil wire elements constituting the exciter 20 are thicker than those constituting the detector 21 in order to suppress Joule loss in the exciter 20, because larger electric current is needed to flow in the exciter 20.

When alternating current is supplied from the alternating current power source 22 to the exciter 20, a variating magnetic field is generated around the exciter 20. Examples of magnetic force lines M are shown as dash lines in FIG. 1. The magnetic field generated by the exciter 20 is substantially symmetrical around the axis A of the exciter 20, although magnetic force lines M on only right side are illustrated in FIG. 1.

Since the variating magnetic field is generated around the exciter 20, eddy current is induced in the tested object 11. The eddy current causes a reactive magnetic field to be generated. The reactive magnetic field is detected as a voltage by the detector 21 and the detector circuit. Since the reactive magnetic field changes because of the flaw 14, the flaw 14 can be detected as a change in the voltage by the detector circuit.

If the tested object 11 is made of an ordinary metallic material, most of the magnetic flux passes through the tested object 11 as a result of skin effect, and substantially no magnetic field exists on the back surface (the second flat surface 13) of the tested object 11. In a case where the tested object 11 is a stainless steel plate of 2 mm thickness and alternating current of a frequency of 500 kHz is supplied, depth of penetration with the skin effect would be about 0.7 mm.

On the other hand, if the tested object 11 is made of a complex material, depth of penetration of the magnetic field due to the skin effect is larger compared to that in case of ordinary metal. Therefore, the magnetic field penetrates the tested object 11, and there exists the magnetic field even on the back surface (the second flat surface 13) of the tested object 11. However, the magnetic flux density in the tested object 11 is lower than that in the tested object 11 of ordinary metal.

In the present embodiment, the exciter 20 and the detector 21 are separated and disposed sandwiching the tested object 11 therebetween. Thus, the exciter 20 and the detector 21 can be disposed close to the tested object 11. Thus, the detector 21 can be disposed at a location where the magnetic flux density is relatively high, which results in a relatively high accuracy in the flaw detection.

The exciter 20 and the detector 21 may not have a same structure or a same specification. They can be designed to have different coil wire element thicknesses, different numbers of turns, different shapes and different sizes, for example, to fit their respective coils. The coils of the exciter 20 preferably have thicker coil wire elements because relatively larger electric current is needed to flow there. On the other hand, the coils of the detector 21 preferably have thinner coil wire elements and more wire turns, because the coils of the detector 21 do not need to allow large electric current while it is preferred to have a larger voltage output to be gained.

When the tested object 11 is made of a low electric conductivity material such as a complex material, highly sensitive flaw detection can be conducted by setting the power source with higher frequency which would result in a smaller penetration depth. Therefore, the frequency of the power source is preferably in order of MHz.

Second Embodiment

Figure 2:
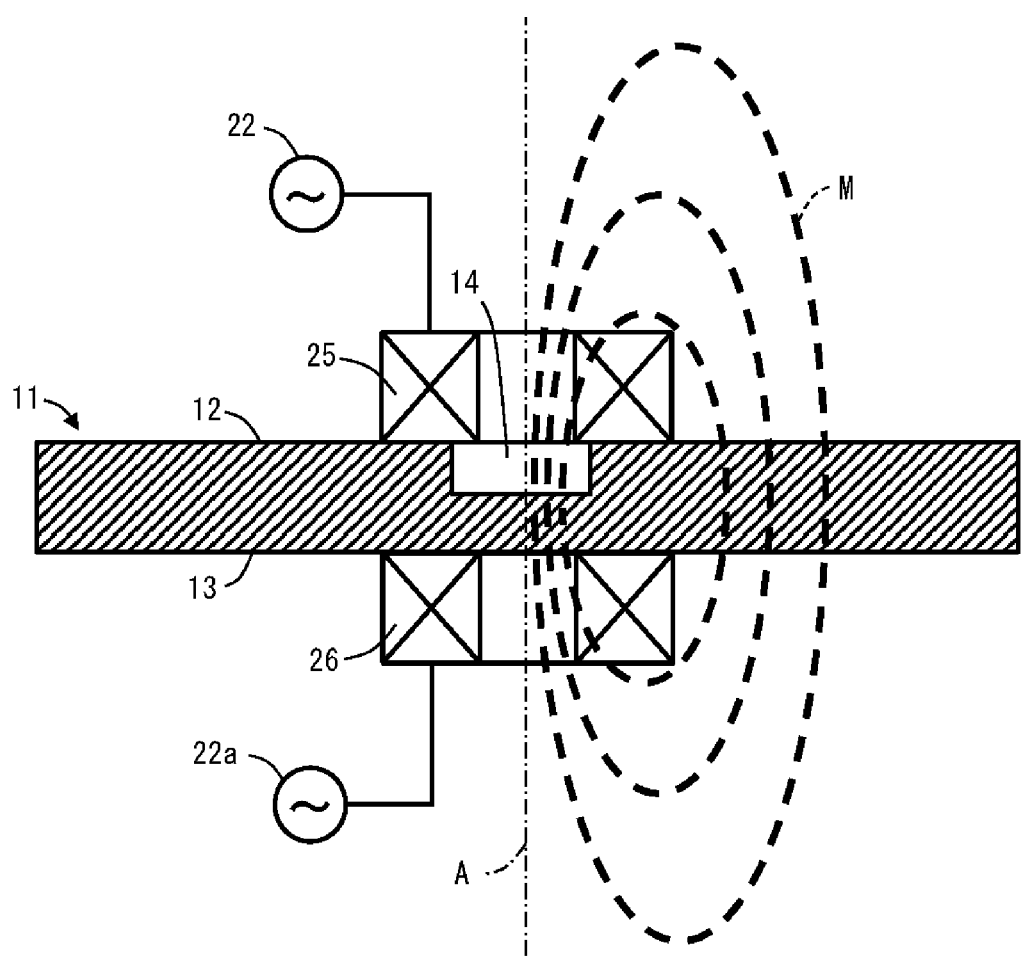
FIG. 2 is a schematic cross-sectional view illustrating a situation where flaw detection is conducted using an eddy current flaw detection device according to a second embodiment of the present invention.

FIG. 2 is a schematic cross-sectional view illustrating a situation where flaw detection is conducted using an eddy current flaw detection device according to a second embodiment of the present invention.

The eddy current flaw detection device according to the second embodiment has a first exciter/detector 25 and a second exciter/detector 26.

The first exciter/detector 25 and the second exciter/detector 26 are both helical coils, for example. The first exciter/detector 25 is disposed on the first flat surface 12 of the tested object 11, while the second exciter/detector 26 is disposed on the second flat surface 13 of the tested object 11. The first exciter/detector 25 and the second exciter/detector 26 are disposed so that the axis A of the coils is directed perpendicular to the first flat surface 12 and the second flat surface 13. The first exciter/detector 25 is connected to an alternating current power source 22. The second exciter/detector 26 is connected to another alternating current power source 22a. The first exciter/detector 25 and the second exciter/detector 26 are connected to respective detector circuits (not illustrated).

The first exciter/detector 25 and the second exciter/detector 26 have substantially same structures, and each has both functions of an exciter and a detector. The alternating current power sources 22 and 22a may have same structures, and preferably, they have the same frequency and the same phase, synchronizing each other. Alternatively, the alternating current power sources 22 and 22a may be a single alternating current power source.

According to the second embodiment, effects of the excitation actions in the first exciter/detector 25 and the second exciter/detector 26 are combined together, and higher density of magnetic flux is obtained. Then, eddy current induced in the tested object 11 would be enhanced, which would result in a larger change in reactive magnetic flux generated by the eddy current. Then, relatively large voltage change is detected by the first exciter/detector 25 and the second exciter/detector 26 which function as detectors. In addition, still larger voltage change can be detected by adding the voltages obtained by the first exciter/detector 25 and the second exciter/detector 26 which function as detectors.

In the above description, the alternating current supplied to the first exciter/detector 25 and the second exciter/detector 26 have preferably same frequency and same phase and are synchronized with each other. However, even in cases where such a condition is not satisfied, the magnetic fields generated by the first exciter/detector 25 and the second exciter/detector 26 may be enhanced by each other in some other conditions, and flaw detection may be conducted in such other conditions where the magnetic fields are enhanced by each other.

In addition, in the above description, both the first exciter/detector 25 and the second exciter/detector 26 function as detectors, and the voltage signals detected by them are added. However, the voltage signals detected by the first exciter/detector 25 and the second exciter/detector 26 may be processed for flaw detection, by subtraction rather than addition, depending on the phase relation between the alternating currents supplied to the first exciter/detector 25 and the second exciter/detector 26.

Further alternatively, it would be possible that only one of the first exciter/detector 25 and the second exciter/detector 26 is used as a detector and the voltage signal from the one is used for flaw detection.

Third Embodiment

Figure 3:
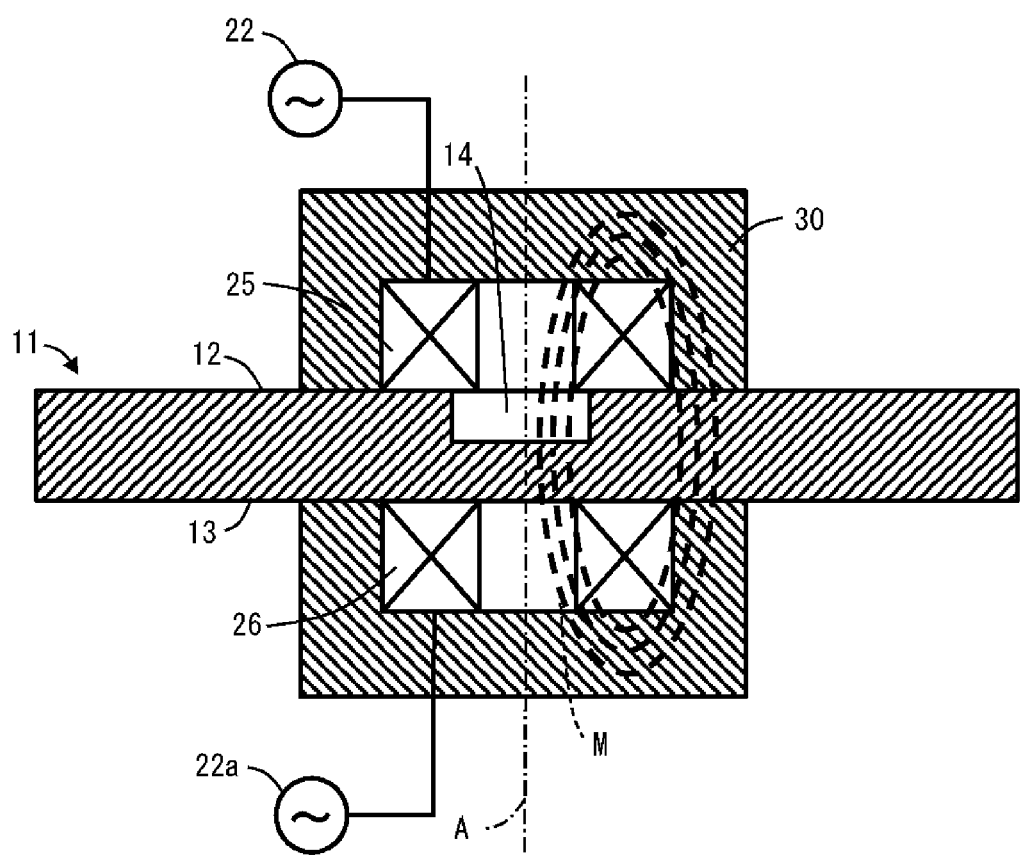
FIG. 3 is a schematic cross-sectional view illustrating a situation where flaw detection is conducted using an eddy current flaw detection device according to a third embodiment of the present invention.

FIG. 3 is a schematic cross-sectional view illustrating a situation where flaw detection is conducted using an eddy current flaw detection device according to a third embodiment of the present invention.

The third embodiment is a modification of the second embodiment. In the third embodiment, the outer surfaces of the first exciter/detector 25 and the second exciter/detector 26 except the parts facing the tested object 11 are covered with covers 30 made of ferromagnetic material. The other structures are the same as the structures of the second embodiment.

According to the third embodiment, the effects of the second embodiment are obtained. In addition, the magnetic field generated by supplying alternating current to the first exciter/detector 25 and the second exciter/detector 26 is distributed along the magnetic path formed in the covers 30 of ferromagnetic material, and the magnetic flux density would be enhanced. Thus, the magnetic flux density penetrating the flaw 14 and crossing the first exciter/detector 25 or the second exciter/detector 26 can be enhanced, which enables highly sensitive flaw detection.

In the example shown in FIG. 3, all portions of the first exciter/detector 25 and the second exciter/detector 26 which do not face the tested object 11 are covered with the covers 30 of ferromagnetic material. As a modified example, alternatively, only some portions of the first exciter/detector 25 and the second exciter/detector 26 which do not face the tested object 11 are covered with the covers 30. Even in such a modified case, the effect of the covers 30 of ferromagnetic material can be partially obtained.

The third embodiment described above is a modification of the second embodiment, and the outer surfaces of the first exciter/detector 25 and the second exciter/detector 26 except the parts facing the tested object 11 are covered with covers 30 of ferromagnetic material. As a modification of the third embodiment, alternatively, the outer surfaces of the exciter 20 and the detector 21 of the first embodiment except the parts facing the tested object 11 may be covered with the covers 30 of ferromagnetic material. Even in such a modified case, the magnetic flux density in the tested object 11 can be enhanced as the effect of the covers 30 of ferromagnetic material.

Fourth Embodiment

Figure 4:
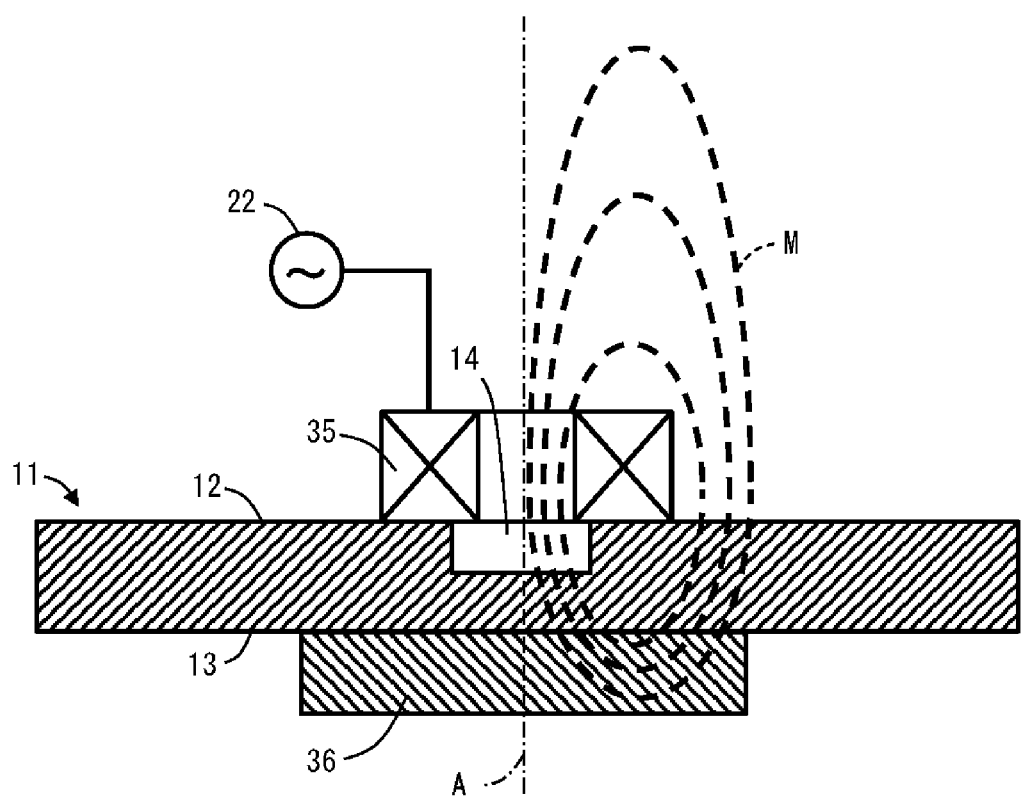
FIG. 4 is a schematic cross-sectional view illustrating a situation where flaw detection is conducted using an eddy current flaw detection device according to a fourth embodiment of the present invention.

FIG. 4 is a schematic cross-sectional view illustrating a situation where flaw detection is conducted using an eddy current flaw detection device according to a fourth embodiment of the present invention.

The eddy current flaw detection device according to the fourth embodiment has an exciter/detector 35 and a backside body 36 made of ferromagnetic material. The exciter/detector 35 of this embodiment is disposed in contact with the first flat surface 12, and may have a structure similar to the structure of the first exciter/detector 25 of the second embodiment. The exciter/detector 35 is connected to the alternating current power source 22 and the detector circuit (not illustrated). The backside body 36 of ferromagnetic material is disposed opposite to the exciter/detector 35 sandwiching the tested object 11 therebetween, and in contact with the second flat surface 13. The backside body 36 preferably covers all part of the second surface 13 which opposes to the exciter/detector 35 sandwiching the tested object 11. The exciter/detector 35 has both functions of an exciter and a detector.

According to the fourth embodiment, alternating current is supplied from the alternating current power source 22 to the exciter/detector 35, and variating magnetic field is formed in and around the tested object 11. Thus, eddy current is induced in the tested object 11, and a reactive magnetic field is formed. Owing to the backside body 36 of ferromagnetic material, the magnetic flux density in the tested object 11 is enhanced, and sensitivity of detection of the flaw 14 is enhanced.

Fifth Embodiment

Figure 5:
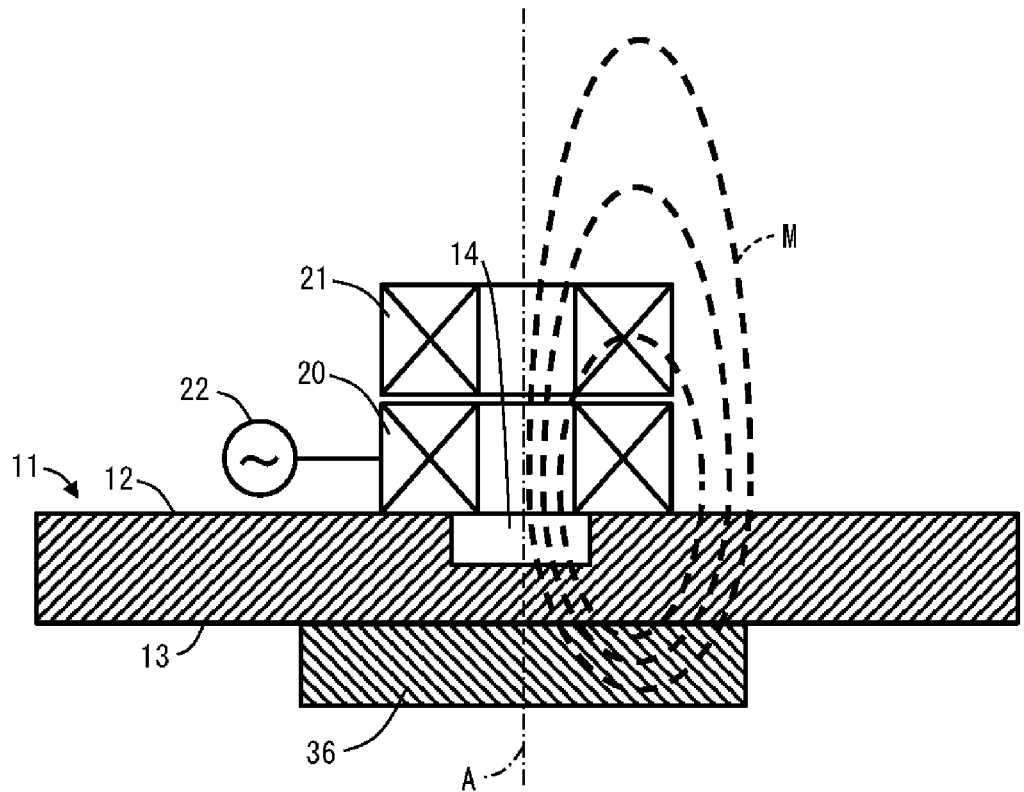
FIG. 5 is a schematic cross-sectional view illustrating a situation where flaw detection is conducted using an eddy current flaw detection device according to a fifth embodiment of the present invention.

FIG. 5 is a schematic cross-sectional view illustrating a situation where flaw detection is conducted using an eddy current flaw detection device according to a fifth embodiment of the present invention.

The fifth embodiment is a modification of the fourth embodiment. In the fifth embodiment, the exciter/detector 35 of the fourth embodiment is replaced with an exciter 20 and a detector 21. The structures of the exciter 20 and the detector 21 of the fifth embodiment may be the same as those of the exciter 20 and the detector 21 of the first embodiment. In the fifth embodiment, the exciter 20 is disposed in contact with the first flat surface 12 of the tested object 11 while the detector 21 is disposed opposite to the tested object sandwiching the exciter 20 therebetween. The other structures are the same as those of the fourth embodiment.

According to the fifth embodiment, the magnetic flux density is enhanced owing to the backside body 36, as the fourth embodiment, and sensitivity of detection of the flaw 14 is enhanced. Since the exciter 20 and the detector 21 are separated, as in the first embodiment, the exciter 20 and the detector 21 may have different structures and different specifications, and may have different designs with coil wire diameters, numbers of coil wire turns, shapes and sizes, etc., to fit respective purposes.

Sixth Embodiment

Figure 6:
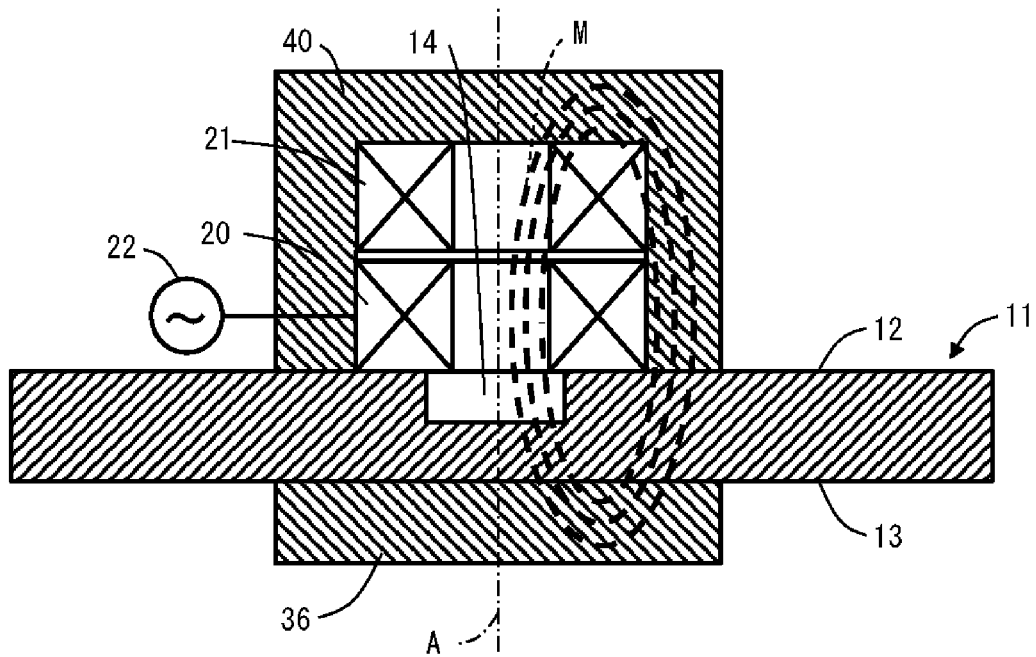
FIG. 6 is a schematic cross-sectional view illustrating a situation where flaw detection is conducted using an eddy current flaw detection device according to a sixth embodiment of the present invention.

FIG. 6 is a schematic cross-sectional view illustrating a situation where flaw detection is conducted using an eddy current flaw detection device according to a sixth embodiment of the present invention.

The sixth embodiment is a modification of the fifth embodiment. In the sixth embodiment, a cover 40 made of ferromagnetic material is disposed covering the exciter 20 and the detector 21 which are structured and disposed in a similar way as in the fifth embodiment.

According to the sixth embodiment, the effects of the fifth embodiment are obtained, and the magnetic flux density in the tested object 11 can be further enhanced owing to the cover 40 made of ferromagnetic material. Then, sensitivity of detection of the flaw 14 can be further enhanced.

Seventh Embodiment

Figure 7:
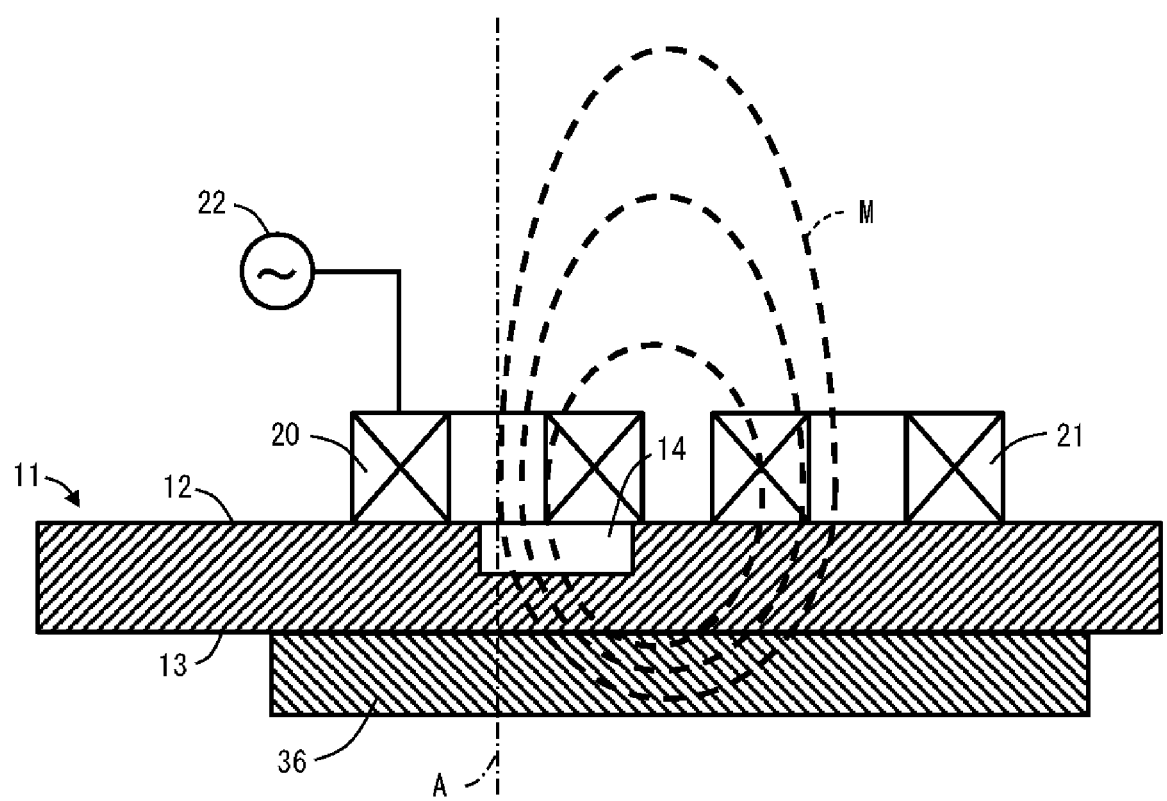
FIG. 7 is a schematic cross-sectional view illustrating a situation where flaw detection is conducted using an eddy current flaw detection device according to a seventh embodiment of the present invention.

FIG. 7 is a schematic cross-sectional view illustrating a situation where flaw detection is conducted using an eddy current flaw detection device according to a seventh embodiment of the present invention.

The seventh embodiment is a modification of the fifth embodiment. In the seventh embodiment, the exciter 20 and the detector 21 are arranged parallel to each other both in contact with the first flat surface 12 of the tested object 11. The backside body 36 of ferromagnetic material is disposed opposite to the exciter 20 and the detector 21 sandwiching the tested object 11 therebetween, and in contact with the second flat surface 13. The backside body 36 preferably covers all part of the second surface 13 which opposes to the exciter 20 and the detector 21 sandwiching the tested object 11. The other structures of the seventh embodiment are same as those of the fifth embodiment.

According to the seventh embodiment, in a similar way as in the fifth embodiment, the magnetic flux density in the tested object 11 can be enhanced owing to the backside body 36 of ferromagnetic material. Then, sensitivity of detection of the flaw 14 can be enhanced. In addition, since the exciter 20 and the detector 21 are separated, the exciter 20 and the detector 21 may have different structures and different specifications, and may have different designs with coil wire diameters, numbers of coil wire turns, shapes and sizes, etc., to fit respective purposes.

Other Embodiments

The features of the embodiments described above can be combined. For example, the cover 40 in the sixth embodiment can be added to the fourth and seventh embodiments.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF REFERENCE SYMBOLS

11: tested object; 12: first flat surface; 13: second flat surface; 14: flaw (thinner part); 20: exciter (first exciter/detector); 21: detector (second exciter/detector); 22, 22a: alternating current power source; 25: first exciter/detector; 26: second exciter/detector; 30: cover; 35: exciter/detector; 36: backside body; 40: cover

What is claimed is:
1. An eddy current flaw detection device comprising:
an exciter/detector configured to induce eddy current in a tested object and to detect a change in a reactive magnetic field generated by the eddy current, the reactive magnetic field penetrating the tested object and existing on a back surface of the tested object due to skin effect, wherein the exciter/detector includes:
an exciter configured to induce eddy current in the tested object, and
a detector to detect a change in a reactive magnetic field generated by the eddy current, the detector being separated from the exciter, and the detector and the exciter being located on the same side of the test body; and
a backside body made of ferromagnetic material disposed opposite side of the exciter/detector sandwiching the tested object therebetween, the backside body being disposed at a position where the reactive magnetic field exists to enhance a magnetic flux in the tested object.
2. The eddy current flaw detection device according to claim 1, wherein
each of the exciter and the detector has a coil including a helical coil wire, and
the coil wire of the exciter is thicker than the coil wire of the detector.
3. The eddy current flaw detection device according to claim 2, wherein
the outer surfaces of the exciter and the detector except the parts facing the tested object are covered with covers made of ferromagnetic material.
4. The eddy current flaw detection device according to claim 1, wherein
the outer surfaces of the exciter and the detector except the parts facing the tested object are covered with covers made of ferromagnetic material.
5. The eddy current flaw detection device according to claim 1, wherein
each of the exciter and the detector has a coil including a helical coil wire, and
the coil wire of the exciter is thicker than the coil wire of the detector.
6. An eddy current flaw detection method comprising:
an exciter/detector disposing step of disposing an exciter and a detector near a tested object and on the same side of the tested object so that a magnetic field penetrates the tested object and exists on a back surface of the tested object due to skin effect;

a backside body disposing step of disposing a backside body made of ferromagnetic material, at a position where the magnetic field exists to enhance a magnetic flux in the tested object and near the tested object at an opposite side of the exciter/detector sandwiching the tested object therebetween;

an excitation step, after the exciter/detector disposing step and the backside body disposing step, of inducing eddy current in the tested object by the exciter/detector; and a detection step of detecting, by the exciter/detector, a change of reactive magnetic field generated by the eddy current.

7. An eddy current flaw detection device comprising:

an exciter configured to induce eddy current in a tested object so that a magnetic field penetrates the tested object and exists on a back surface of the tested object due to skin effect, a detector configured to detect a change in a reactive magnetic field generated by the eddy current, the detector and the exciter being located on the same side of the tested object, a backside body made of ferromagnetic material disposed on an opposite side of the exciter and the detector sandwiching the tested object therebetween, the backside body being disposed at a position where the magnetic field exists to enhance a magnetic flux in the tested object, and a cover made of ferromagnetic material covering at least some part of surroundings of the exciter and the detector, the at least some part of the surroundings of the exciter and the detector being not facing the tested object.

* * * * *

UNITED STATES PATENT AND TRADEMARK OFFICE
CERTIFICATE OF CORRECTION

PATENT NO. : 11,598,750 B2
APPLICATION NO. : 17/156834
DATED : March 7, 2023
INVENTOR(S) : Noriyasu Kobayashi It is certified that error appears in the above-identified patent and that said Letters Patent is hereby corrected as shown below:

In the Claims

In Claim 6, Column 9, Lines 6-7, "and near the tested object at an opposite side" should read --and at an opposite side--.

Signed and Sealed this
Twenty-second Day of August, 2023

Katherine Kelly Vidal
*Director of the United States Patent and Trademark Office*